US011889867B2

(12) United States Patent
Courbat et al.

(10) Patent No.: US 11,889,867 B2
(45) Date of Patent: Feb. 6, 2024

(54) AEROSOL-GENERATING DEVICE FOR INDUCTIVE HEATING OF AN AEROSOL-FORMING SUBSTRATE

(71) Applicant: Philip Morris Products S.A., Neuchatel (CH)

(72) Inventors: Jerome Christian Courbat, Neuchatel (CH); Enrico Stura, Neuchatel (CH); Dani Ruscio, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 401 days.

(21) Appl. No.: 17/283,849

(22) PCT Filed: Oct. 10, 2019

(86) PCT No.: PCT/EP2019/077437
§ 371 (c)(1),
(2) Date: Apr. 8, 2021

(87) PCT Pub. No.: WO2020/074622
PCT Pub. Date: Apr. 16, 2020

(65) Prior Publication Data

US 2021/0378311 A1 Dec. 9, 2021

(30) Foreign Application Priority Data

Oct. 11, 2018 (EP) .................................... 18199781

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *H05B 6/105* (2013.01); *H05B 6/365* (2013.01)

(58) Field of Classification Search
None
See application file for complete search history.

(56) References Cited

U.S. PATENT DOCUMENTS

2006/0192644 A1 8/2006 Hendel
2014/0261495 A1 9/2014 Novak, III et al.
(Continued)

FOREIGN PATENT DOCUMENTS

CN 206137197 U 5/2017
EP 0 806 124 11/1997
(Continued)

OTHER PUBLICATIONS

Combined Russian Office Action and Search Report dated Jan. 26, 2023 in Russian Patent Application No. 2021112176/03 (with English Translation), 13 pages.
(Continued)

*Primary Examiner* — Tho D Ta
(74) *Attorney, Agent, or Firm* — Oblon, McClelland, Maier & Neustadt, L.L.P.

(57) ABSTRACT

An aerosol-generating device for generating an aerosol by inductive heating of an aerosol-forming substrate is provided, the device including a device housing including a cavity configured to receive the aerosol-forming substrate; an induction source including an induction coil configured to generate an alternating magnetic field within the cavity, the induction coil being arranged around at least a portion of the cavity; a flux concentrator arranged around the induction coil and configured to distort the alternating magnetic field of the induction source towards the cavity; and a bond layer firmly coupled to a least a portion of the flux concentrator, the bond layer including or consisting of a poly(p-xylylene) polymer. There is also provided an aerosol-generating system including an aerosol-generating device including and an
(Continued)

aerosol-generating article for the device, the article including an aerosol-forming substrate to be heated.

15 Claims, 4 Drawing Sheets

(51) Int. Cl.

| | |
|---|---|
| ***H05B 6/10*** | (2006.01) |
| ***H05B 6/36*** | (2006.01) |

(56) References Cited

U.S. PATENT DOCUMENTS

| | | | | |
|---|---|---|---|---|
| 2017/0071250 | A1* | 3/2017 | Mironov | A24F 40/465 |
| 2017/0156404 | A1 | 6/2017 | Novak, III et al. | |
| 2018/0132525 | A1 | 5/2018 | Patil et al. | |
| 2018/0132531 | A1* | 5/2018 | Sur | H05B 1/0244 |
| 2019/0182909 | A1 | 6/2019 | Fursa et al. | |

FOREIGN PATENT DOCUMENTS

| | | | | |
|---|---|---|---|---|
| EP | 3357359 | A2 * | 8/2018 | A24F 40/465 |
| RU | 2 643 421 | C2 | 2/2018 | |
| WO | WO 2018/041450 | A1 | 3/2018 | |
| WO | WO-2018041450 | A1 * | 3/2018 | A24B 15/167 |

OTHER PUBLICATIONS

International Search Report and Written Opinion dated Jan. 8, 2020 in PCT/EP2019/077437 filed on Oct. 10, 2019.

* cited by examiner

AEROSOL-GENERATING DEVICE FOR INDUCTIVE HEATING OF AN AEROSOL-FORMING SUBSTRATE

The present invention relates to an aerosol-generating device for generating an aerosol by inductively heating an aerosol-forming substrate. The invention further relates to an aerosol-generating system comprising such a device and an aerosol-generating article, wherein the article comprises the aerosol-forming substrate to be heated.

Aerosol-generating systems based on inductively heating an aerosol-forming substrate that is capable to form an inhalable aerosol are generally known from prior art. Such systems may comprise an aerosol-generating device having a cavity for receiving the substrate to be heated. The substrate may be integral part of an aerosol-generating article that is configured for use with the device. For heating the substrate, the device may comprise an inductive heater that includes an induction source for generating an alternating magnetic field within the cavity. The field is used to induce at least one of heat generating eddy currents or hysteresis losses in a susceptor which is arranged in thermal proximity or direct physical contact with the substrate in order to be heated. In general, the susceptor may be either fixed in the device or integral part of the article.

However, the magnetic field may not only inductively heat the susceptor, but also other susceptive parts of the aerosol-generating device or susceptive external items in close proximity to the device. To reduce such undesired heating, the aerosol-generating device may be provided with a flux concentrator arranged around the field source which acts a magnetic shielding. However, it has been observed that the shielding effect is often reduced or even lost when the device has suffered from excessive force impacts or shocks, for example, after the device has accidentally fallen down.

Therefore, it would be desirable to have an aerosol-generating device and system for inductively heating an aerosol-forming substrate with the advantages of prior art solutions but without their limitations. In particular, it would be desirable to have an aerosol-generating device and system comprising a magnetic shielding providing enhanced robustness.

According to the invention there is provided an aerosol-generating device for generating an aerosol by inductively heating an aerosol-forming substrate. The device comprises a device housing comprising a cavity configured for receiving the aerosol-forming substrate to be heated. The device further comprises an induction source comprising an induction coil for generating an alternating magnetic field within the cavity, wherein the induction coil is arranged around at least a portion of the receiving cavity. The device also comprises a flux concentrator arranged around the induction coil and configured to distort the alternating magnetic field of the induction source during use of the device towards the cavity. Furthermore, the device comprises a bond layer firmly coupled to a least a portion of the flux concentrator, in particular for keeping possible fragments of the flux concentrator bonded in case of a breakage of the flux concentrator into fragments. That is, the bond layer is preferably configured for keeping possible fragments of the flux concentrator bonded in case of a breakage of the flux concentrator into fragments.

As used herein, the term “concentrate the magnetic field” means that the flux concentrator is able to distort the magnetic field so that the density of the magnetic field is increased within the cavity.

By distorting the magnetic field towards the cavity, the flux concentrator reduces the extent to which the magnetic field propagates beyond the induction coil. That is, the flux concentrator acts as a magnetic shield. This may reduce undesired heating of adjacent susceptive parts of the device, for example a metallic outer housing, or of adjacent susceptive items external to the device. By reducing undesired heating losses, the efficiency of the aerosol-generating device may be further improved.

Furthermore, by distorting the magnetic field towards the cavity, the flux concentrator advantageously can concentrate or focus the magnetic field within the cavity. This may increase the level of heat generated in the susceptor for a given level of power passing through the induction coil in comparison to induction coils having no flux concentrator. Thus, the efficiency of the aerosol-generating device may be improved.

According to the invention it has been recognized that the reduced or lost effect of the flux concentrator is often due to a breakage of the flux concentrator. Typically, magnetic flux concentrators are made of materials which are brittle and thus can easily break into fragments when exposed to excessive force impacts. As a consequence, integrity of the flux concentrator is lost causing the magnetic flux through the shattered flux concentrator to be reduced.

According to the invention, it has been further recognized that the effect of the flux concentrator may be still sufficient if the fragments of the magnetic flux concentrator are kept close together such as to be still capable to effectively concentrate a magnetic flux. As to this, the bond layer according to the present invention serves a support layer being fixedly coupled to at least a portion of the flux concentrator. Due to its fixed coupling, the bond layer keeps possible fragments of the flux concentrator bonded, that is, in position in the event of breakage of the flux concentrator into fragments.

Advantageously, the bond layer itself is impact resistant. That is, the bond layer advantageously is configured not to break or rupture in case of an excessive force impact. Accordingly, the bond layer may be at least one of shock-proof or tear-resistant.

In addition to its bonding function, the bond layer may also have shock-absorbing properties. Advantageously, this may even allow for preventing the flux concentrator from breakage, that is, to protect integrity of the flux concentrator in case of an excessive force impact.

The bond layer may be fixedly coupled to at least a portion of the flux concentrator by at least one of the following means or processes: gluing, cladding, welding, plating, depositing, and coating, in particular dip coating or roll coating or evaporation coating.

Preferably, the bond layer is a coating covering at least a portion of a surface of the flux concentrator. Advantageously, coating may be easily applied after manufacturing of the flux concentrator but prior to assemblage of the device. The coating process beneficially results in a uniform bond across a large portion of the surface of the flux concentrator or even the entire surface. The bond layer may be applied as coating to the flux concentrator by evaporation under vacuum, preferably at room temperature (for example 20 degree Celsius). Advantageously, this enables to provide a thin bonding layer which does not significantly increase the outer dimensions of the flux concentrator. This is particularly important as regards dimensional accuracy. In addition, applying the bond layer at room temperature may prevent additional thermal stress on the material of the flux concentrator.

The bond layer has a layer thickness in a range between 0.1 micrometer and 200 micrometer, in particular between 0.2 micrometer and 150 micrometer, preferably between 0.5 micrometer and 100 micrometer. Alternatively, the bond layer may have a layer thickness in a range between 0.5 micrometer and 200 micrometer. As mentioned above, such layer thicknesses substantially do not affect the outer dimensions of the flux concentrator.

Preferably, the bond layer is a polymeric bond layer. Polymeric bond layers prove advantageous as being flexible and thus shock-proof. In addition, polymeric bond layers may allow for a simple processing.

The bond layer may comprise or consist of a poly(p-xylylene) polymer, in particular a chemical vapor deposited poly(p-xylylene) polymer. In particular, the bond layer may comprise or consist of a parylene, for example, one of parylene C, parylene N, parylene D or parylene HT. The term "parylene" denotes a group of poly(p-xylylene) polymers, in particular chemical vapor deposited poly(p-xylylene) polymers, often used as moisture and dielectric barriers. Parylenes are biostable and biocompatible, and approved for medical application (FDA [Food and Drug Administration)] certified). Parylenes are optically transparent, flexible and chemically inert, thus providing a high corrosion protection. Parylenes are thermally stable, having a melting point above 290 degree Celsius or even higher, depending on the specific parylene type. This makes parylenes particularly suitable for use in aerosol-generating systems.

Advantageously, parylenes may be applied as thin-films or coatings, in particular to a large variety of substrates, such as metals, glass, varnish, plastic materials, ferrite materials or silicones. Preferably, parylene coatings may be applied to the substrate under vacuum, in particular at room temperature (for example 20 degree Celsius) by re-sublimation from the gas phase as a pore-free and transparent polymer film. This process may provide a uniform layer formation which is mechanically stable, abrasion resistant, and which produces low mechanical stresses and does not show outgassing. In addition, evaporation coating under vacuum allows for coating a plurality of substrates simultaneously, making the process suitable for mass production.

Due to the gaseous deposition of parylene, areas and structures can be achieved and coated, which are not coatable with liquid-based processes, such as sharp edges, peaks or narrow and deep gaps.

Parylene coatings may have a layer thickness in a range from 0.1 micrometer to several hundred micrometers. Advantageously, parylene coatings having a layer thicknesses in a range between 0.1 micrometer and 50 micrometer can be applied in one process. Above a layer thickness of 0.6 micrometer parylene coatings are free of micro-pores and pinholes.

As used herein, the term "flux concentrator" refers to a component having a high relative magnetic permeability which acts to concentrate and guide the magnetic field or magnetic field lines generated by an induction coil.

As used herein, the term "high relative magnetic permeability" refers to a relative magnetic permeability of at least 5, for example at least 10, at least 20, at least 30, at least 40, at least 50, at least 60, at least 80, or at least 100. These example values refer to the values of relative magnetic permeability for a frequency of between 6 and 8 MHz and a temperature of 25 degrees Celsius.

As used herein and within the art, the term "relative magnetic permeability" refers to the ratio of the magnetic permeability of a material, or of a medium, such as the flux concentrator, to the magnetic permeability of free space $\mu_0$, where $\mu$-0 is $4\pi\cdot10^{-7}\ N\cdot A^{-2}$ (4·Pi·10E-07 Newton per square Ampere).

Accordingly, the flux concentrator preferably comprises a material or combination of materials having a relative magnetic permeability of at least 5 at 25 degrees Celsius, preferably at least 20 at 25 degrees Celsius. The flux concentrator may be formed from a plurality of different materials. In such embodiments, the flux concentrator, as an overall medium, may have a relative magnetic permeability of at least 5 at 25 degrees Celsius, preferably at least 20 at 25 degrees Celsius. These example values preferably refer to the values of relative magnetic permeability for a frequency of between 6 and 8 MHz and a temperature of 25 degrees Celsius.

The flux concentrator may be formed from any suitable material or combination of materials. Preferably, the flux concentrator comprises a ferromagnetic material, for example a ferrite material, a ferrite powder held in a binder, or any other suitable material including ferrite material such as ferritic iron, ferromagnetic steel or stainless steel.

In general, the flux concentrator may be of any type and may have any configuration, shape and arrangement within the device suitable to distort the alternating magnetic field of the induction source during use of the device towards the cavity. In particular, the thermal conductor element may have a configuration, shape and arrangement based on the configuration, shape and arrangement of the receiving cavity and the induction source as well as on the desired level of distortion of the magnetic field.

The flux concentrator may extend along only part of the length of the induction coil. Preferably, the flux concentrator extends along substantially the entire length of the induction coil. The flux concentrator may extend beyond the induction coil at one or both ends of the induction coil The flux concentrator may extend around only part of the circumference of the induction coil. Likewise, the flux concentrator may be circumferentially arranged around the induction coil. The flux concentrator may be a cylindrical flux concentrator or a tubular flux concentrator or a flux concentrator sleeve. In such configurations, the flux concentrator completely circumscribes the induction coil along at least part of the length of the coil. A tubular shape or sleeve shape proves particularly advantageously with regard to a cylindrical shape of the cavity as well as to a cylindrical and/or helical configuration of the induction coil. As to this shapes, the flux concentrator may have any suitable cross-section. For example, the flux concentrator may have a square, oval, rectangular, triangular, pentagonal, hexagonal, or similar cross-sectional shape. Preferably, the flux concentrator has a circular cross-section. For example, the flux concentrator may have a circular, cylindrical shape.

Preferably, the bond layer covers the entire surface of the flux concentrator. However, for keeping possible fragments of the flux concentrator bonded, it may be also sufficient that the bond layer covers only a portion of the flux concentrator. Applying the bond layer selectively to only a portion of the flux concentrator may be achieved, for example, by coating in combination with masking.

With regard to a tubular shape or sleeve shape or cylindrical shape, the bond layer may be firmly coupled to at least a portion of an inner surface or an outer surface of the tubular flux concentrator or the flux concentrator sleeve or cylindrical flux concentrator. Likewise, the bond layer may be firmly coupled to at least a portion of both, an inner surface and an outer surface of the tubular flux concentrator or the flux concentrator sleeve or cylindrical flux concentrator. In addition, the bond layer may also be coupled to one or both end faces of the tubular flux concentrator or the flux concentrator sleeve or cylindrical flux concentrator.

The flux concentrator may comprise a plurality of flux concentrator segments. The flux concentrator segments may be positioned adjacent to one another. This includes arrangements in which the segments are in direct contact as well as arrangements in which two or more of the segments are separated by a gap, such as an air gap or a gap containing one or more intermediate components between adjacent segments. Thus, the flux concentrator is an assembly of multiple, separate components. This allows the flux concentrator, and thus the degree to which the magnetic field is distorted, to be tuned by removing or adding one or more flux concentrator segments to the flux concentrator. For example, one or more flux concentrator segments may be replaced with a segment formed from a material having a lower relative magnetic permeability, such as plastic, to reduce the degree to which the magnetic field is distorted by the flux concentrator. Accordingly, the plurality of flux concentrator segments may include a first flux concentrator segment formed from a first material and a second flux concentrator segment formed from a second, different material, wherein the first and second materials have different values of relative magnetic permeability. This "tuning" of the flux concentrator may allow a predetermined value of magnetic field strength to be achieved within the cavity, in particular at the location in which the susceptor element is located in use.

Preferably, each flux concentrator segment is provided with a respective bond layer which is firmly coupled to a least a portion of the associated flux concentrator segment.

The plurality of flux concentrator segments may have a uniform size and shape. In other examples, one or more of the plurality of flux concentrator segments may have a different size, shape, or size and shape relative to one or more of the other flux concentrator segments. This allows simple tuning of the flux concentrator by swapping one or more of the segments with segments having different dimensions.

The shape of the flux concentrator segments may be selected based on the desired shape of the resulting flux concentrator.

As an example, the flux concentrator may comprise a plurality of flux concentrator segments, wherein the plurality of flux concentrator segments may be tubular and arranged coaxially next to each other. In this configuration, the resulting flux concentrator is tubular and completely circumscribes the induction coil along at least part of the length of the coil. The tubular flux concentrator segments may be partially cylindrical. In other embodiments, the thickness of one or more of the tubular segments may vary along its length. The tubular flux concentrator segments may have a square, oval, rectangular, triangular, pentagonal, hexagonal, or similar cross-sectional shape, according to the desired shape of the resulting flux concentrator.

As another example, the flux concentrator comprises a plurality of flux concentrator segments, wherein the plurality of flux concentrator segments are elongate and arranged—with respect to their respective longitudinal axes—parallel to each other around the circumference of the flux concentrator. Preferably, the plurality of elongate flux concentrator segments are arranged such that their longitudinal axes are substantially parallel with the magnetic axis of the induction coil. Alternatively, the elongate segments may be arranged such that their respective longitudinal axes are non-parallel. As used herein, the term 'elongate' refers to a component having a length which is greater than both its width and thickness, for example twice as great. The elongate flux concentrator segments may have any suitable cross-section. For example, the elongate flux concentrator segments may have a square, oval, rectangular, triangular, pentagonal, hexagonal, or similar cross-sectional shape, according to the desired shape of the resulting flux concentrator. The elongate flux concentrator segments may have a planar, or flat, cross-sectional area. The elongate flux concentrator segments may have an arc-shaped cross-section. This may be particularly beneficial where the induction coil has a curved outer surface, for example where the induction coil has a circular cross-section. This allows the elongate flux concentrator segments to closely follow the outer shape of the induction coil, reducing the overall dimensions of the aerosol-generating device.

The plurality of flux concentrator segments may be fixed directly to the induction coil, for example using an adhesive. The device coil may further comprise one or more intermediate components between the induction coil and the flux concentrator segments by which the segments are retained in position relative to the induction coil.

For example, the device may further comprise an outer support sleeve, circumscribing the induction coil, to which the segments are attached. The outer support sleeve may have a number of slots or recesses within which the flux concentrator segments are held. Where the flux concentrator segments are annular, the recesses may be annular and arranged to retain the annular segments. Where the plurality of flux concentrator segments are elongate and are positioned around the circumference of the flux concentrator, the outer support sleeve circumscribing the induction coil and having a plurality of longitudinal slots in which the elongate flux concentrator segments are held.

Alternatively or in addition, the device may comprise an inner support sleeve having an outer surface on which the induction coil is supported. The inner surface of the inner support sleeve may define the side walls of the cavity along at least part of the length of the cavity. The inner support sleeve may be removable from the device housing, for example to allow for servicing or replacement of the induction module. The inner support sleeve preferably comprises at least one protrusion on its outer surface at one or both ends of the induction coil for retaining the induction coil on the inner support sleeve. The at least one protrusion prevents or reduces longitudinal movement of the induction coil relative to the inner sleeve. Even more preferably, the at least one protrusion is also configured and arranged to retain in position at least one of: the flux concentrator, the plurality of flux concentrator segments and the outer support sleeve. For this, the at least one protrusion preferably extends (radially) above the outer surface by a distance which is equal to or greater than the combined thickness of the induction coil and the outer support sleeve, and preferably the flux concentrator (segments).

The thickness of the flux concentrator may depend on the material or combination of materials from which it is made, as well as the shape of the induction coil and of the flux concentrator and on the desired level of magnetic field distortion. Selection of the flux concentrator material and dimensions allows the shape, strength and density of the magnetic field to be tuned according to the heating and power requirements of the susceptor element or susceptor elements with which the induction source will be coupled during use. For example, the flux concentrator may have a thickness of from 0.3 millimeter to 5 millimeter, preferably from 0.5 millimeter to 1.5 millimeter. In certain embodiments, the flux concentrator comprises ferrite and has a thickness of from 0.3 millimeter to 5 millimeter, preferably from 0.5 millimeter to 1.5 millimeter. As used herein, the term "thickness" refers to the dimension in the transverse direction of a component of the aerosol-generating device or of the aerosol-generating article at a particular location along its length or around its circumference. When referring specifically to the flux concentrator, the term "thickness" refers to half the difference between the outer diameter and inner diameter of the flux concentrator at a particular location. As used herein, the term "longitudinal" is used to describe the direction along the main axis of the aerosol-generating device, and the term "'transverse" is used to describe the direction perpendicular to the longitudinal direction.

The thickness of the flux concentrator may be substantially constant along its length. In other examples, the thickness of the flux concentrator may vary along its length. For example, the thickness of the flux concentrator may taper, or decrease, from one end to another, or from a central portion of the flux concentrator towards both ends. The thickness of the flux concentrator may be substantially constant around its circumference. In other examples, the thickness of the flux concentrator may vary around its circumference.

In addition to the induction source, the aerosol-generating device may comprise at least one susceptor element which is part of the device. Alternatively, the at least one susceptor element may be integral part of an aerosol-generating article which comprises the aerosol-forming substrate to be heated. As part of the device, the at least one susceptor element is arranged or arrangeable at least partially within the cavity such as to be in thermal proximity to or thermal contact, preferably physical contact with the aerosol-forming substrate during use.

As used herein, the term "susceptor element" refers to an element that is capable to convert magnetic energy into heat when subjected to an alternating magnetic field. This may be the result of at least one of hysteresis losses or eddy currents induced in the susceptor, depending on the electrical and magnetic properties of the susceptor material. Hysteresis losses occur in ferromagnetic or ferrimagnetic susceptors due to magnetic domains within the material being switched under the influence of an alternating magnetic field. Eddy currents may be induced if the susceptor is electrically conductive. In case of an electrically conductive ferromagnetic or ferrimagnetic susceptor, heat can be generated due to both, eddy currents and hysteresis losses.

Accordingly, the susceptor element may be formed from any material that can be inductively heated to a temperature sufficient to generate an aerosol from the aerosol-forming substrate. Preferred susceptor elements comprise a metal or carbon. A preferred susceptor element may comprise a ferromagnetic material, for example ferritic iron, or a ferromagnetic steel or stainless steel. A suitable susceptor element may be, or comprise, aluminum. Preferred susceptor elements may be formed from 400 series stainless steels, for example grade 410, or grade 420, or grade 430 stainless steel.

The susceptor element may comprise a variety of geometrical configurations. The susceptor element is preferably a susceptor pin, a susceptor rod, a susceptor blade, a susceptor strip or a susceptor plate. Alternatively, the susceptor element may be a filament susceptor, a mesh susceptor, a wick susceptor or a susceptor sleeve, a susceptor cup or a cylindrical susceptor.

As used herein, the term "aerosol-generating device" generally refers to an electrically operated device that is capable of interacting with at least one aerosol-forming substrate, in particular with an aerosol-forming substrate provided within an aerosol-generating article, such as to generate an aerosol by heating the substrate. Preferably, the aerosol-generating device is a puffing device for generating an aerosol that is directly inhalable by a user thorough the user's mouth. In particular, the aerosol-generating device is a hand-held aerosol-generating device.

In addition to the induction coil, the induction source may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the induction coil for generating an alternating magnetic field. The AC current may be supplied to the induction coil continuously following activation of the system or may be supplied intermittently, such as on a puff by puff basis.

Preferably, the induction source comprises a DC/AC converter connected to the DC power supply including an LC network, wherein the LC network comprises a series connection of a capacitor and the induction coil.

The induction source preferably is configured to generate a high-frequency magnetic field. As referred to herein, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The aerosol-generating device may further comprise a controller configured to control operation of the device. In particular, the controller may be configured to control operation of the induction source, preferably in a closed-loop configuration, for controlling heating of the aerosol-forming substrate to a pre-determined operating temperature. The operating temperature used for heating the aerosol-forming substrate may be at least 300 degree Celsius, in particular at least 350 degree Celsius, preferably at least 370 degree Celsius, most preferably of at least 400 degree Celsius. These temperatures are typical operating temperatures for heating but not combusting the aerosol-forming substrate.

The controller may comprise a microprocessor, for example a programmable microprocessor, a microcontroller, or an application specific integrated chip (ASIC) or other electronic circuitry capable of providing control. The controller may comprise further electronic components, such as at least one of a DC/AC inverter or a power amplifier, for example a Class-D or Class-E power amplifier. In particular, the induction source may be part of the controller.

The aerosol-generating device may comprise a power supply, in particular a DC power supply configured to provide a DC supply voltage and a DC supply current to the induction source. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction source.

The aerosol-generating device may comprise a main body which preferably includes at least one of the induction source, the induction coil, the flux concentrator, the bond layer the inner support sleeve the outer support sleeve, the controller, the power supply and at least a portion of the cavity.

In addition to the main body, the aerosol-generating device may further comprise a mouthpiece, in particular in case the aerosol-generating article to be used with the device does not comprise a mouthpiece. The mouthpiece may be mounted to the main body of the device. The mouthpiece may be configured to close the receiving cavity upon mounting the mouthpiece to the main body. For attaching the mouthpiece to the main body, a proximal end portion of the main body may comprise a magnetic or mechanical mount, for example, a bayonet mount or a snap-fit mount, which engages with a corresponding counterpart at a distal end portion of the mouthpiece. In case the device does not comprise a mouthpiece, an aerosol-generating article to be used with the aerosol-generating device may comprise a mouthpiece, for example a filter plug.

The aerosol-generating device may comprise at least one air outlet, for example, an air outlet in the mouthpiece (if present).

Preferably, the aerosol-generating device comprises an air path extending from the at least one air inlet through the receiving cavity, and possibly further to an air outlet in the mouthpiece, if present. Preferably, the aerosol-generating device comprises at least one air inlet in fluid communication with the receiving cavity. Accordingly, the aerosol-generating system may comprise an air path extending from the at least one air inlet into the receiving cavity, and possibly further through the aerosol-forming substrate within the article and a mouthpiece into a user's mouth.

The induction coil, the inner support sleeve, the flux concentrator and, if present, the outer support sleeve may form an induction module that is arranged within the device housing and which forms or is circumferentially arranged, in particular removably arranged around at least a portion of the cavity of the device. As being fixedly coupled to the flux concentrator, the bond layer may also be part of the induction coil.

As to this, the present invention also provides an induction module arrangeable within an aerosol-generating device such as to form or being circumferentially arranged around at least a portion of a cavity of the device, wherein the cavity is configured for receiving an aerosol-forming substrate to be inductively heated. The induction module comprises an induction coil for generating an alternating magnetic field within the cavity in use, wherein the induction coil is arranged around at least a portion of the receiving cavity when the induction module is arranged in the device. The induction module further comprises a flux concentrator circumferentially arranged around the induction coil and configured to distort the alternating magnetic field of the induction coil during use towards the cavity, when the induction module is arranged in the device. In addition, the induction module comprises a bond layer firmly coupled to a least a portion of the flux concentrator for keeping fragments of the flux concentrator bonded in case of a breakage of the flux concentrator into fragments.

In addition, the induction module may comprise at least one of an inner support sleeve and an outer support sleeve as described before.

Likewise, the flux concentrator may comprise a plurality of flux concentrator segments as described above.

Further features and advantages of the induction module, in particular of the induction coil, the flux concentrator, the flux concentrator segments, the bond layer, the inner support sleeve and the outer support sleeve have been described with regard to the aerosol-generating device and will not be repeated.

According to the invention there is also provided an aerosol-generating system which comprises an aerosol-generating device according to the invention and as described herein. The system further comprises an aerosol-generating article for use with the device, wherein the article comprises an aerosol-forming substrate to be inductively heated by the device.

As used herein, the term "aerosol-generating system" refers to the combination of an aerosol-generating article as further described herein with an aerosol-generating device according to the invention and as described herein. In the system, the article and the device cooperate to generate a respirable aerosol.

As used herein, the term "aerosol-generating article" refers to an article comprising at least one aerosol-forming substrate that, when heated, releases volatile compounds that can form an aerosol. Preferably, the aerosol-generating article is a heated aerosol-generating article. That is, an aerosol-generating article which comprises at least one aerosol-forming substrate that is intended to be heated rather than combusted in order to release volatile compounds that can form an aerosol. The aerosol-generating article may be a consumable, in particular a consumable to be discarded after a single use. For example, the article may be a cartridge including a liquid aerosol-forming substrate to be heated. Alternatively, the article may be a rod-shaped article, in particular a tobacco article, resembling conventional cigarettes.

As used herein, the term "aerosol-forming substrate" denotes a substrate formed from or comprising an aerosol-forming material that is capable of releasing volatile compounds upon heating for generating an aerosol. The aerosol-forming substrate is intended to be heated rather than combusted in order to release the aerosol-forming volatile compounds. The aerosol-forming substrate may be a solid or a liquid aerosol-forming substrate. In both cases, the aerosol-forming substrate may comprise both solid and liquid components. The aerosol-forming substrate may comprise a tobacco-containing material containing volatile tobacco flavor compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerine and propylene glycol. The aerosol-forming substrate may also comprise other additives and ingredients, such as nicotine or flavourants. The aerosol-forming substrate may also be a paste-like material, a sachet of porous material comprising aerosol-forming substrate, or, for example, loose tobacco mixed with a gelling agent or sticky agent, which could include a common aerosol former such as glycerine, and which is compressed or molded into a plug.

As mentioned before, the at least one susceptor element used for inductively heating the aerosol-forming substrate may be integral part of the aerosol-generating article, instead of the device. Accordingly, the aerosol-generating article may comprises at least one susceptor element positioned in thermal proximity to or thermal contact with the aerosol-forming substrate such that in use the susceptor element is inductively heatable by the induction source when the article is received in the cavity of the device.

Further features and advantages of the aerosol-generating system according to the invention have been described with regard to the aerosol-generating device and will not be repeated.

The invention will be further described, by way of example only, with reference to the accompanying drawings, in which.

Figure 1:
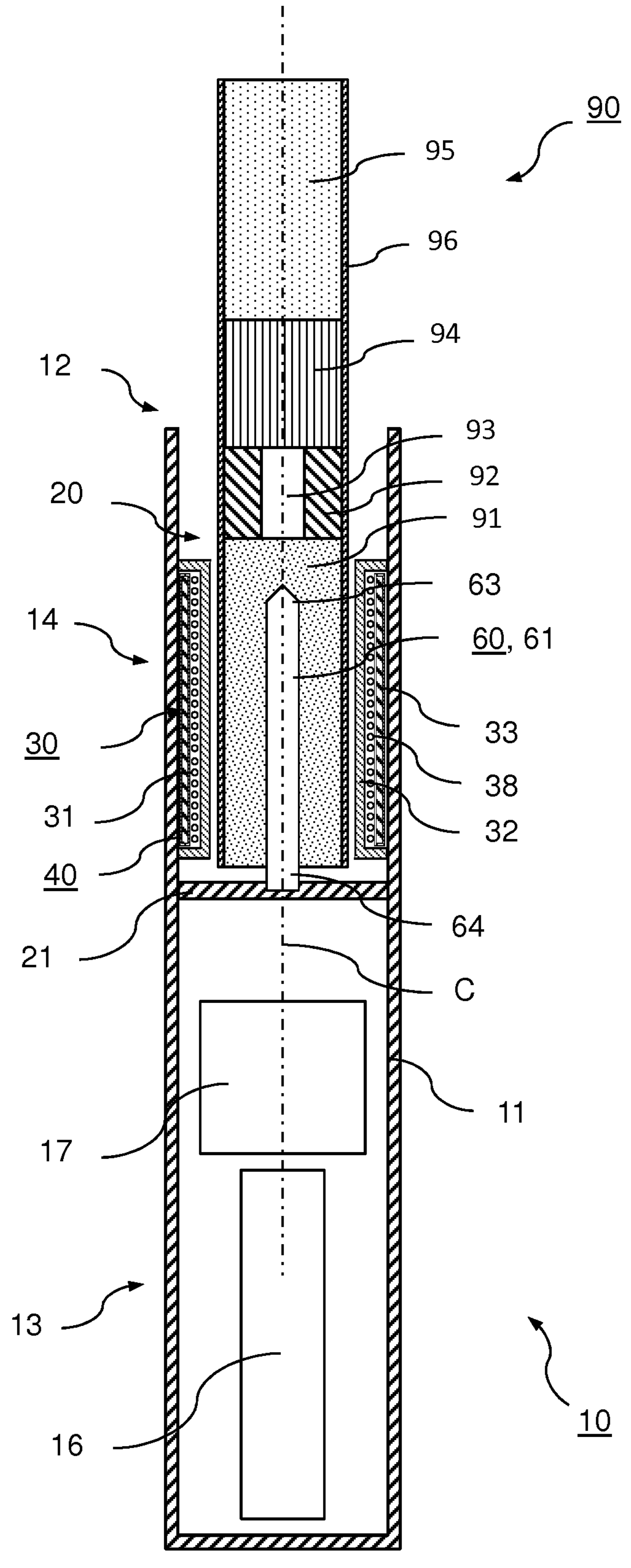
FIG. 1 shows a schematic longitudinal cross-section of an aerosol-generating system in accordance with a first embodiment the present invention.

FIG. 1 shows a schematic cross-sectional illustration of an exemplary embodiment of an aerosol-generating system 1 according to the present invention. The system 1 is configured for generating an aerosol by inductively heating an aerosol-forming substrate 91. The system 1 comprises two main components: an aerosol-generating article 90 including the aerosol-forming substrate 91 to be heated, and an aerosol-generating device 10 for use with the article 90 which comprises a receiving cavity 20 for receiving the article 90, and an inductive heater for heating the substrate 91 within the article 90 when the article 90 is inserted into the receiving cavity 20.

The article 90 has a rod shape resembling the shape of a conventional cigarette and comprises four elements arranged in coaxial alignment: an aerosol-forming substrate 91, a support element 92, an aerosol-cooling element 94, and a filter plug 95, the latter serving as a mouthpiece. The aerosol-forming substrate 91 may include, for example, a crimped sheet of homogenized tobacco material including glycerin as an aerosol-former. The support element 92 comprises a hollow core forming a central air passage 93. The filter plug 95 may, for example, include cellulose acetate fibers. All four elements are substantially cylindrical elements being arranged sequentially one after the other. The elements have substantially the same diameter and are circumscribed by an outer wrapper 96 made of cigarette paper such as to form a cylindrical rod.

The device 10 comprises a substantially rod-shaped main body 11 formed by a substantially cylindrical device housing. Within a distal portion 13, the device 10 comprises a power supply 16, for example a lithium ion battery, and an electric circuitry 17 including a controller for controlling operation of the device 10, in particular for controlling the heating process. Within a proximal portion 14 opposite to the distal portion 13, the device 10 comprises the receiving cavity 20. The receiving cavity 20 is open at the proximal end 12 of device 10, thus allowing the article 90 to be readily inserted into the receiving cavity 20.

A bottom portion 21 of the receiving cavity separates the proximal portion 14 of the device 10, in particular the receiving cavity 20, from the distal portion 13 of the device 10. Preferably, the bottom portion is made of a thermally insulating material, for example, PEEK (polyether ether ketone). Thus, electric components within the distal portion 13 may be kept separate from aerosol or residues produced by the aerosol generating process within the cavity 20.

The inductive heater of the device 10 comprises an induction source including an induction coil 31 for generating an alternating, in particular high-frequency magnetic field. In the present embodiment, the induction coil 31 is a helical coil circumferentially surrounding the cylindrical receiving cavity 20. The induction coil 31 is formed from a wire 38 and has a plurality of turns, or windings, extending along its length. The wire 38 may have any suitable cross-sectional shape, such as square, oval, or triangular. In this embodiment, the wire 38 has a circular cross-section. In other embodiments, the wire may have a flat cross-sectional shape.

The inductive heater further comprises a susceptor element 60 that is arranged within the receiving cavity such as to experience the magnetic field generated by the induction coil 31. In the present embodiment, the susceptor element 60 is a susceptor blade 61. With its distal end 64, the susceptor blade is arranged at the bottom portion 21 of the receiving cavity 20 of the device. From there, the susceptor blade 61 extends into the inner void of the receiving cavity 20 towards the opening of the receiving cavity 20 at the proximal end 12 of the device 10. The other end of the susceptor blade 60, that is, the distal free end 63 is tapered such as to allow the susceptor blade to readily penetrate the aerosol-forming substrate 91 within the distal end portion of the article 90.

When the device 10 is actuated, a high-frequency alternating current is passed through the induction coil 31. This causes the coil 31 to generate an alternating magnetic field within cavity 20. As a consequence, the susceptor blade 61 heats up due to at least one of eddy currents or hysteresis losses, depending on the magnetic and electric properties of the materials of the susceptor element 60. The susceptor 60 in turn heats the aerosol-forming substrate 91 of the article 90 to a temperature sufficient to form an aerosol. The aerosol may be drawn downstream through the aerosol-generating article 90 for inhalation by the user. Preferably, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The induction coil 31 is part of an induction module 30 that is arranged with the proximal portion 14 of the aerosol-generating device 10. The induction module 30 has a substantially cylindrical shape that is coaxially aligned with a longitudinal center axis C of the substantially rod-shaped device 10. As can be seen from FIG. 1, the induction module 30 forms a least a portion of the cavity 20 or at least a portion of an inner surface of the cavity 20.

Figure 2:
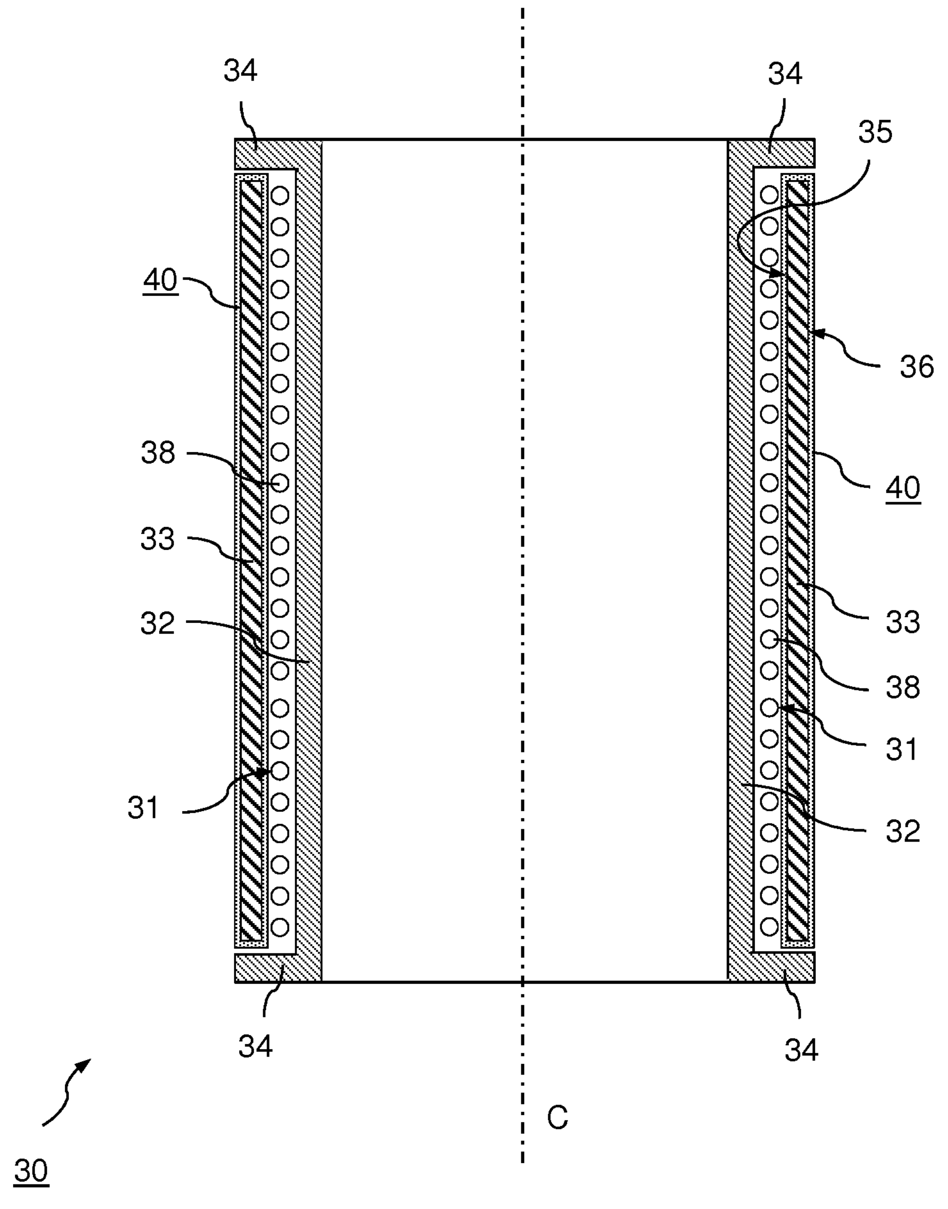
FIG. 2 is a detail view the induction module according to FIG. 1.

FIG. 2 shows the induction module 30 in more detail. Besides the induction coil 31, the induction module 30 comprises a tubular inner support sleeve 32 which carries the helically wound, cylindrical induction coil 31. At both ends, the tubular inner support sleeve 32 has a pair of annular protrusions 34 extending around the circumference of the inner support sleeve 32. The protrusions 34 are located at either end of the induction coil 31 to retain the coil 31 in position on the inner support sleeve 32. The inner support sleeve 32 may be made from any suitable material, such as a plastic. In particular, the inner support sleeve 32 may be a least a portion of the cavity 20, that is, at least a portion of an inner surface of the cavity 20.

Both the induction coil 31 and the inner support sleeve 32 are surrounded by a tubular flux concentrator 33 which extends along the length of the induction coil 31. The flux concentrator 33 is configured to distort the alternating magnetic field generated by the induction coil 31 during use of the device 10 towards the cavity 20. The flux concentrator 33 is fixed around the induction coil 31 and is also retained in position by the annular protrusions 34 of the inner support sleeve 32. The flux concentrator 33 is formed from a material having a high relative magnetic permeability of at least 5, preferably at least, at a frequency in a range between 6 MHz and 8 MHz and at a temperature of 25 degree Celsius. Due to this, the magnetic field produced by the induction coil 31 is attracted to and guided by the flux concentrator 33. Thus, the flux concentrator 33 acts as a magnetic shield. This may reduce undesired heating of or interference with external objects. The magnetic field lines within the inner volume defined by the induction module 30 are also distorted by flux concentrator 33 so that the density of the magnetic field within the cavity 20 is increased. This may increase the current generated within the susceptor blade 61 located in the cavity 20. In this manner, the magnetic field can be concentrated towards the cavity 20 to allow for more efficient heating of the susceptor element 60.

According to the invention, the device comprises a bond layer 40 that is firmly coupled to the flux concentrator 33 for keeping possible fragments of the flux concentrator 33 bonded in case of a breakage of the flux concentrator 33 into fragments. In the present embodiment, the bond layer 40 is provided as a parylene coating deposited on the surface of the flux concentrator 33 such that it extends over substantially the entire surface of the flux concentrator 33. However, it might be sufficient that the bond layer is only applied to one of the inner surface 35 or the outer surface 36 of the tubular flux concentrator 33.

Parylene is particularly suitable as bond layer material as it is chemical inert and thus approved for medical applications. In addition, parylene provides both, sufficient mechanical as well as thermal resistance. The parylene coating can be deposited by evaporation under vacuum to reach very thin layers. Advantageously, a thin bond layer 40 does not significantly increase the outer dimensions of the flux concentrator 33. In the present embodiment, the bond layer 40 has a layer thickness of about 50 micrometer. Parylene coatings can even fill possible pores in the surface of the flux concentrator 33.

In addition, the parylene bond layer 40 provides a corrosion protection of the flux concentrator 33 from the harsh environments in the cavity 20.

Figure 3:
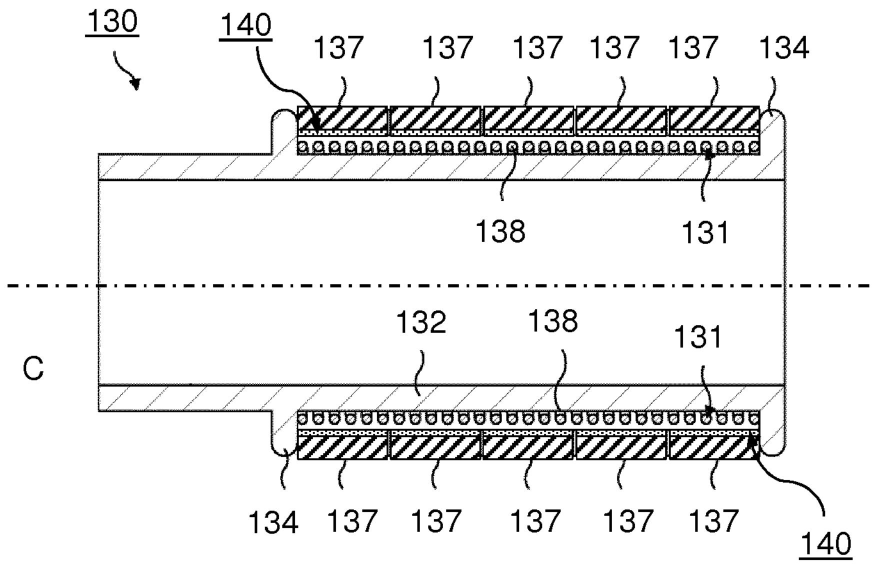
FIG. 3 shows a schematic longitudinal cross-section of a second embodiment of an induction module which can be alternatively used with the system according to FIG. 1.
Figure 4:
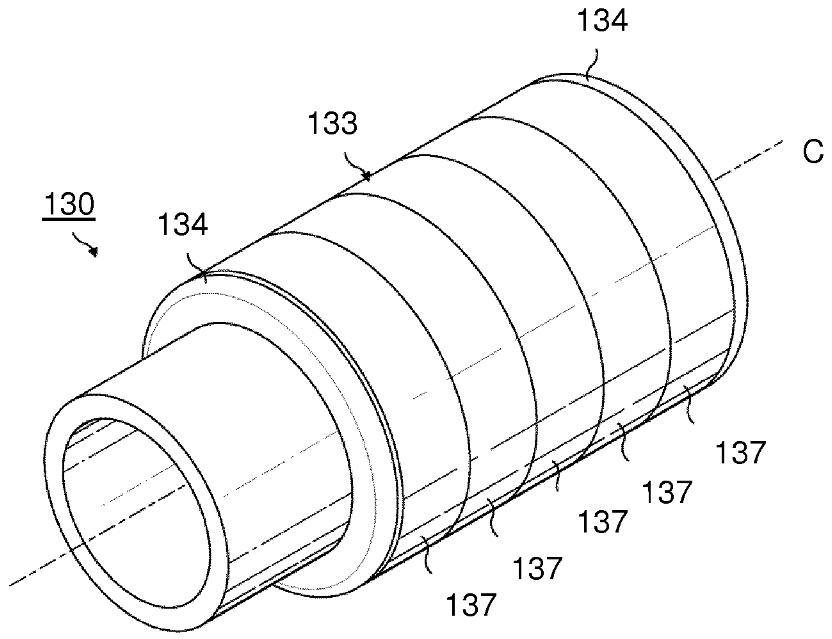
FIG. 4 is a perspective view of the induction module of FIG. 3.

FIG. 3 and FIG. 4 illustrate an induction module 130 according to second embodiment of the invention. The induction module 130 is very similar to the induction module 30 according to FIG. 1 and FIG. 2. Therefore, like or identical features are denoted with the same reference numerals as in FIG. 1 and FIG. 2, yet incremented by 100. Unlike the flux concentrator 33 shown in FIG. 1 and FIG. 2, the induction module 130 according to the second embodiment comprises a flux concentrator 133 which is not a unitary component but is instead formed from a plurality of flux concentrator segments 137. The flux concentrator segments 137 are tubular and are positioned adjacent to one another as well as coaxially along the length of the flux concentrator 133. The flux concentrator segments 137 may have different relative magnetic permeability values. This allows the flux concentrator 133 to be "fine-tuned" to achieve a desired level of induction from the induction coil and a desired level of magnetic flux in the cavity. As with the induction module 30 of the first embodiment, the induction module 130 includes a tubular inner support sleeve 132 having annular protrusions 134 retaining the helically wound wire 138 of induction coil 131 and the flux concentrator segments 137 in position.

Each of the flux concentrator segments 137 is provided with a bond layer 140 such that each segment 137 is separately held together in case of breakage. In contrast to the previous embodiment, the bond layer 140 is a parylene coating that is deposited only on the inner surface 135 of each flux concentrator segment 137. Of course, the bond layer 140 may alternatively be applied such that it extends over substantially the entire surface of each segment 137.

Figure 5:
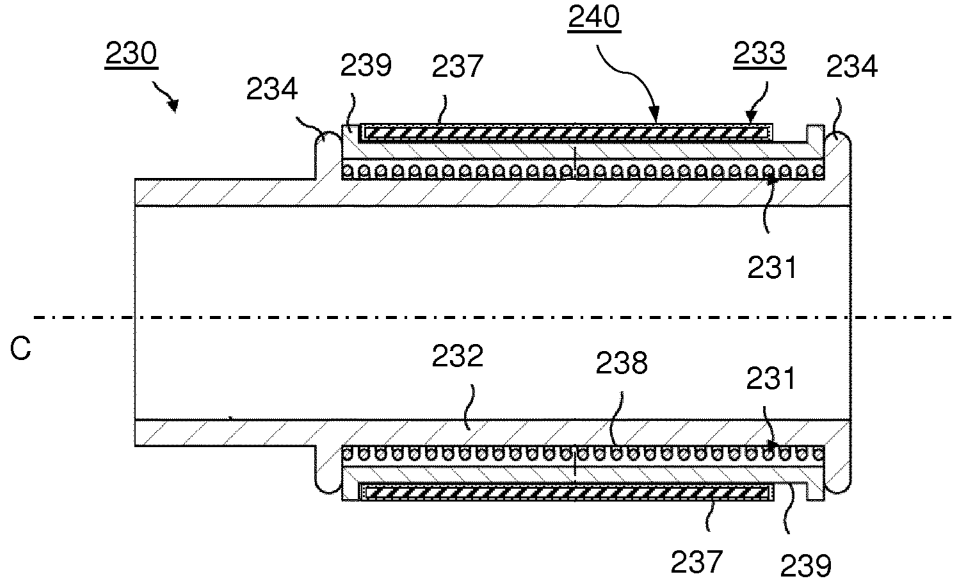
FIG. 5 shows a schematic longitudinal cross-section of a third embodiment of an induction module which can be alternatively used with the system according to FIG. 1.
Figure 6:
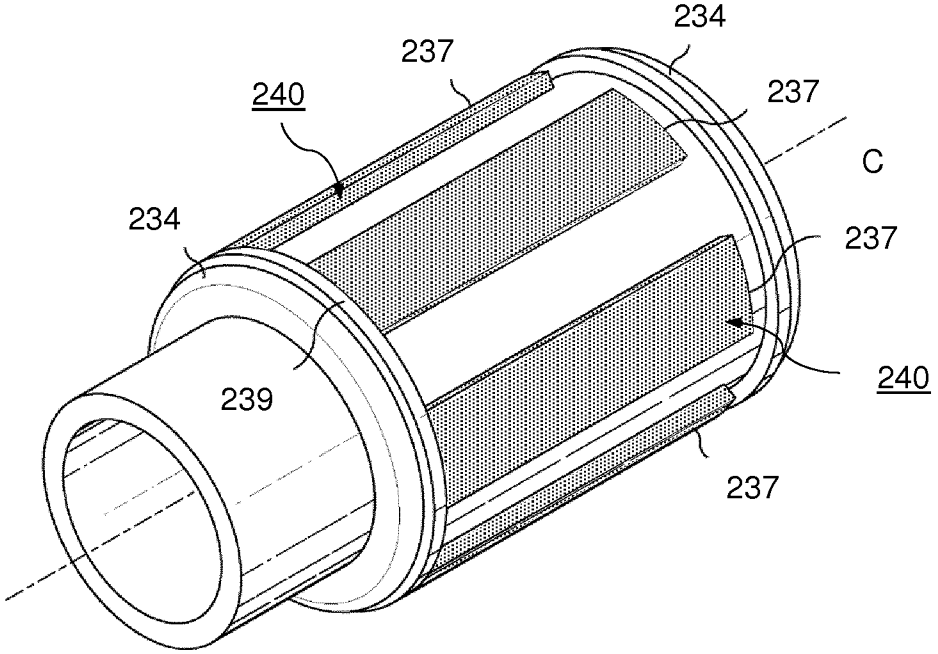
FIG. 6 is a perspective view of the induction module of FIG. 5.

FIG. 5 and FIG. 6 illustrate an induction module 230 according to a third embodiment of the invention. The induction module 230 is very similar to the induction module 130 according to FIG. 3 and FIG. 4. Therefore, like or identical features are denoted with the same reference numerals as in FIG. 3 and FIG. 4, yet incremented by 100. Unlike the flux concentrator 133 shown in FIG. 3 and FIG. 4, the induction module 230 comprises a flux concentrator 233 which comprises a plurality of elongate flux concentrator segments 237. The elongate flux concentrator segments 237 are positioned around the circumference of the flux concentrator 233 such that their longitudinal axes are substantially parallel with the magnetic axis of the induction coil 231. The induction module 230 further comprises an outer support sleeve 239 which circumscribes the induction coil 231 and is used to retain the flux concentrator segments 237 in position. To this end, the outer support sleeve 239 includes a plurality of longitudinal slots within which the flux concentrator segments are slidably held. The outer support sleeve 239 has a circular, cylindrical shape. Accordingly, the flux concentrator segments 237 have an arc-shaped cross-section corresponding to the outer shape of the outer support sleeve 239. The longitudinal slots have a length which is greater than the length of the flux concentrator segments 237. As a result, the flux concentrator segments 237 may each be slid within their respective slot to vary their respective longitudinal position while remaining within their respective slots. This allows the magnetic field to be tuned by varying the longitudinal position of one or more of the elongate flux concentrator segments 237. In this example, the flux concentrator segments 237 are arranged on the outer support sleeve 239 such that they are separated by a narrow gap. In other examples, two or more of the flux concentrator segments may be in direct contact with one or both of the flux concentrator segments on either of its sides. As with the induction modules 30, 130 of the first and second embodiment, the induction module 230 of the third embodiment also includes an inner support sleeve 232 having annular protrusions 234 which retain the induction coil 231, the outer support sleeve 239 and the flux concentrator 233 in position.

Each of the flux concentrator segments 237 is provided with a bond layer 240 such that each segment 237 is separately held together in case of breakage. In contrast to the previous embodiment, the bond layer 240 is a parylene coating that is deposited such that it extends over substantially the entire surface of each segment 237.

In all three embodiments according to in FIG. 1-6, the bond layer 40, 140, 240 is applied to the respective flux concentrator 33, 133, 233 prior to assembling the induction module 30, 130, 230.

The invention claimed is:

1. An aerosol-generating device for generating an aerosol by inductive heating of an aerosol-forming substrate, the device comprising:

a device housing comprising a cavity configured to receive the aerosol-forming substrate;

an induction source comprising an induction coil configured to generate an alternating magnetic field within the cavity, wherein the induction coil is arranged around at least a portion of the cavity;

a flux concentrator arranged around the induction coil and configured to distort the alternating magnetic field of the induction source towards the cavity; and a bond layer firmly coupled to a least a portion of the flux concentrator, wherein the bond layer comprises of a poly(p-xylylene) polymer.

2. The aerosol-generating device according to claim 1, wherein the bond layer is a polymeric bond layer.

3. The aerosol-generating device according to claim 1, wherein the poly(p-xylylene) polymer is a chemical vapor deposited poly(p-xylylene) polymer.

4. The aerosol-generating device according to claim 1, wherein the bond layer has a layer thickness in a range between 50 nanometers and 200 micrometers.

5. The aerosol-generating device according to claim 1, wherein the flux concentrator comprises a plurality of flux concentrator segments, and wherein the plurality of flux concentrator segments are elongate and arranged parallel to each other around a circumference of the flux concentrator.

6. The aerosol-generating device according to claim 1, wherein the bond layer covers the entire surface of the flux concentrator.

7. The aerosol-generating device according to claim 1, further comprising at least one susceptor element arranged at least partially within the cavity.

8. The aerosol-generating device according to claim 1, wherein the bond layer is a coating covering at least a portion of a surface of the flux concentrator.

9. The aerosol-generating device according to claim 8, wherein the bond layer is a coating applied by evaporation to the flux concentrator.

10. The aerosol-generating device according to claim 1, wherein the flux concentrator is a tubular flux concentrator or a flux concentrator sleeve.

11. The aerosol-generating device according to claim 10, wherein the bond layer is firmly coupled to at least a portion of at least one of an inner surface or an outer surface of the tubular flux concentrator or the flux concentrator sleeve.

12. The aerosol-generating device according to claim 1, wherein the flux concentrator comprises a plurality of flux concentrator segments, and wherein each flux concentrator segment of the plurality of flux concentrator segments is provided with a respective bond layer, which is firmly coupled to a least a portion of the associated flux concentrator segment.

13. The aerosol-generating device according to claim 12, wherein the plurality of flux concentrator segments are tubular and arranged coaxially next to one another.

14. An aerosol-generating system, comprising an aerosol-generating device according to claim 1 and an aerosol-generating article received or receivable at least partially in the cavity of the device, wherein the aerosol-generating article comprises the aerosol-forming substrate to be heated.

15. The aerosol-generating system according to claim 14, wherein the aerosol-generating article comprises at least one susceptor element positioned in thermal proximity to or thermal contact with the aerosol-forming substrate such that the susceptor element is inductively heatable by the induction source when the article is received in the cavity of the device.

* * * * *